(No Model.)
V. A. STASER.
HAND CAR.
No. 401,469. Patented Apr. 16, 1889.
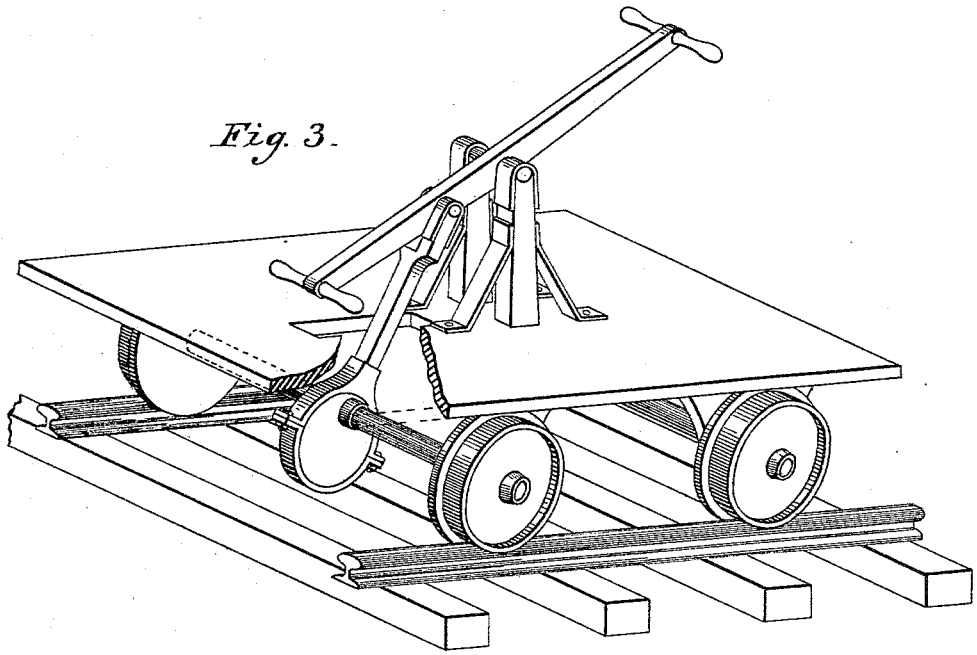
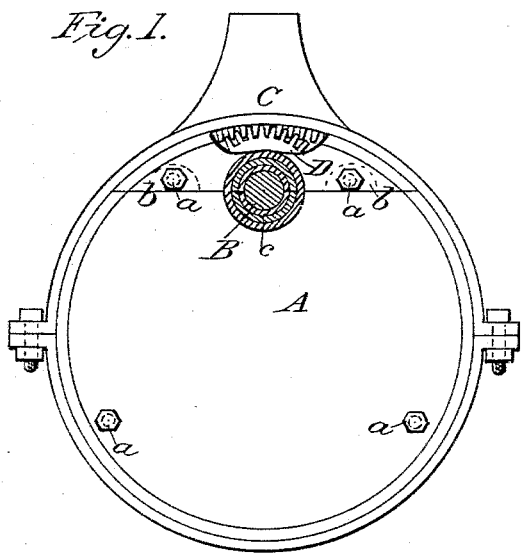
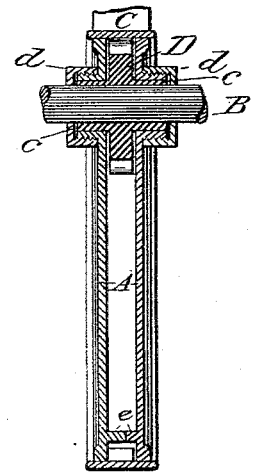
Witnesses:
Jno. Allen.
M. S. Knox
A. B. Stroud
Inventor:
Virgil A. Staser

UNITED STATES PATENT OFFICE.

VIRGIL A. STASER, OF HAINES CITY, FLORIDA.

HAND-CAR.

SPECIFICATION forming part of Letters Patent No. 401,469, dated April 16, 1889.

Application filed September 10, 1888. Serial No. 285,095. (No model.)

*To all whom it may concern:*

Be it known that I, VIRGIL A. STASER, a citizen of the United States, residing at Haines City, in the county of Polk and State of Florida, have invented a new and useful Improvement in Motors for Vehicles Propelled by Manual Power, of which the following is a specification.

My invention relates to that class of vehicles in which the power is applied to the axle by means of levers, connecting-rods, and toothed gearing; and the objects of my improvement are to furnish a simple and compact method of transmitting the propulsive power and of increasing the speed of the vehicle. I attain these objects by the mechanism illustrated in the accompanying drawings, in which—

Figure 1 is a view of the motor, partly in plan and partly in section. Fig. 2 is a vertical section through the center of axle and eccentric-disk. Fig. 3 is a perspective view showing the motor as applied to a railroad hand-car.

Similar letters refer to similar parts in each of the figures.

A represents a metallic disk, made in two parts, which are kept at a uniform distance from each other by suitable projections or lugs, $b\,b\,c\,c$, and secured by bolts $a\,a\,a\,a$. These disks are mounted eccentrically upon the axle B, and serve to guide and limit the motion of the toothed ring or band C, which surrounds their periphery. Between the sides of the disk and secured to the axle B is a toothed pinion, D, to which motion is given by the toothed strap or band C, the relative velocity being governed by the proportion of the strap and pinion to each other. Intermediate wheels may also be inserted to increase the speed, if desired. The disks A A are divided transversely through the center line of the axle B to admit of removal without dismounting the axle, its separate parts being secured by suitable lugs and bolts and by the caps or nuts $d\,d$, by which also the brasses $c\,c$ are retained in place. The ring or band C is connected with a lever or brake of any convenient form by means of the rod $f$, and is operated by alternately elevating and depressing the lever or brake $g$, which causes the pinion D to revolve, and with it the axle B, to which it is secured, and is kept in gear with said pinion by the disks A A.

I am aware that prior to my invention vehicles have been propelled by levers and gearing. I therefore do not claim such a combination, broadly; but What I do claim as my invention, and desire to secure by Letters Patent, is—

1. The combination, in a motor for vehicles, of the lever $g$, connecting-rod $f$, internally-toothed ring or band C, pinion D, and disks A A, all substantially as set forth.

2. The combination, in a motor for vehicles, of the internally-toothed ring or band C, pinion D, and eccentrically-mounted disks A A, all substantially as set forth.

VIRGIL A. STASER.

Witnesses:
SAML. C. HODGEMAN,
M. S. KNOX.